Sept. 8, 1964  A. G. THOMAS  3,147,835
MAGNETIC CLUTCH

Filed April 22, 1960  2 Sheets-Sheet 1

Albert G. Thomas

INVENTOR.

Sept. 8, 1964     A. G. THOMAS     3,147,835
MAGNETIC CLUTCH

Filed April 22, 1960     2 Sheets-Sheet 2

Albert G. Thomas    INVENTOR.

United States Patent Office 3,147,835
Patented Sept. 8, 1964

3,147,835
MAGNETIC CLUTCH
Albert G. Thomas, 133 Bolling Road, Charlottesville, Va.
Filed Apr. 22, 1960, Ser. No. 24,015
17 Claims. (Cl. 192—84)

This invention relates to magnetic clutches. This application includes improvements on my magnetic clutch as disclosed in U.S. Patent No. 2,955,692.

The magnetic particle clutch comprising iron particles in oil or other liquid has been widely used but it has a number of undesirable features such as bunching of the particles due to becoming magnetized and the liquid has caused trouble from leakage. There have also been heating difficulties and sometimes oxidation of the particles. Further, there is a viscous drag resulting from the liquid between the driving and driven members so that it is difficult to eliminate all coupling action when the clutch is de-energized. This is particularly true at relatively high speeds of the driving member.

In order to overcome the above and other difficulties I have devised a magnetic clutch in which magnetic particles, rods, pins, or wires, or the like, are fastened or held in rubber, plastic or other suitable flexible or resilient material so that there can be no aggregates of particles and no leakage of liquid.

An object of the invention is to provide a magnetic clutch or power transmission device which can be energized and de-energized rapidly.

Another object is to provide a magnetic clutch in which magnetic particles or elements cannot become bunched or agglomerated.

A further object is to provide a magnetic clutch in which there is no liquid.

An additional object is to provide a magnetic clutch having a relatively short magnetic path or paths in order to furnish substantial torque with relatively low winding currents.

Another object is to provide a magnetic clutch with a low drag when the clutch winding is deenergized.

Other objects will be evident in the specification.

Figure 1:
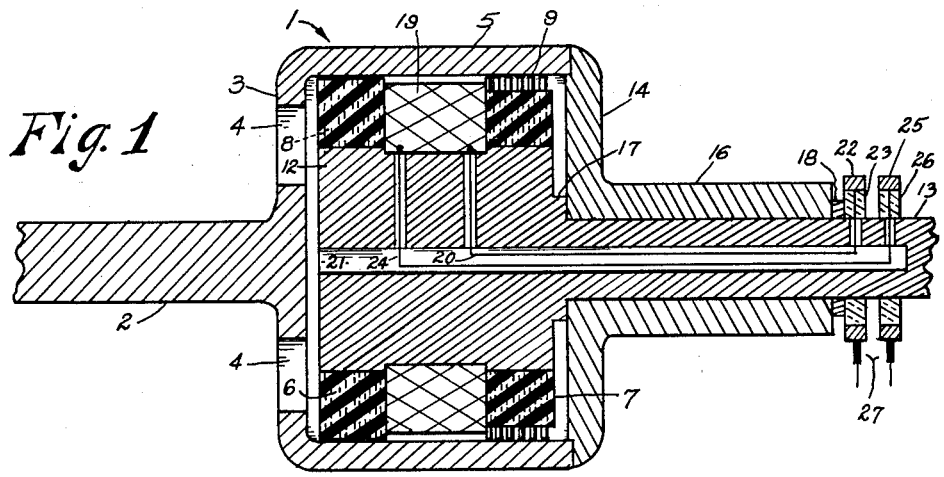
FIGURE 1 is a sectional view, in a plane through the axis, of a magnetic clutch having a pair of rings comprising a yielding or resilient material containing magnetizable rods, wires, or other elements.

In FIGURE 1, clutch driven member 1 comprises a cylindrical member of silicon steel or other material of good magnetic permeability which is integral with coaxial shaft 2 although this shaft may be bolted or otherwise attached to face or wall 3 of the clutch casing. Openings 4 may be provided for ventilation and for reducing the inertia of driven member 1 which includes cylindrical member 5 made of the same material as wall 3. The central portion of member 5 may also be apertured to provide ventilation and to reduce the inertia of the driven members.

Figure 2:
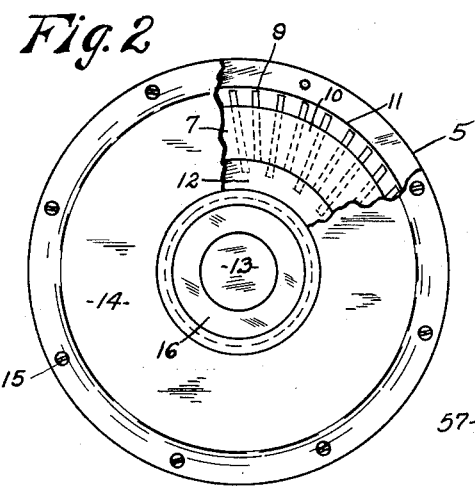
FIGURE 2 is an end elevation of the clutch of FIGURE 1 as seen from the right. A portion of the clutch casing is shown as broken away.

The driving assembly includes magnetizable bands or rings 6 and 7 comprising rubber, plastic, or other resilient or flexible material containing imbedded nails, wires, or rods 8 and 9, respectively. These wires or rods are preferably made of metal of good magnetic permeability and they may be made of silicon steel, nickel steel, ingot iron, or the like. The resilient material of band 6 is shown as extending almost to the smooth inner cylindrical surface of casing member 5 but the resilient or flexible material 10 of band 7 may be of less radius than elements 9, as shown in FIGURE 2. Both rings 6 and 7 may be identical, of either design, or they may be different as shown in FIGURE 1. The construction of band 7 as shown is preferable in one sense in that the elements 9 will have more freedom of movement so that they can be magnetically attracted into contact with the cylindrical inner surface 11 of member 5. The rubber or other yielding member 10 may be of suitable thickness to provide the required movement of the magnetizable elements 9.

Bands or rings 6 and 7 are pressed on cylindrical driving member 12 made of silicon steel or other metal of good magnetic permeability. This member is integral with driving shaft 13 although this shaft could be attached to member 12. Disc 14, preferably made of non-magnetic metal or other material such as brass, aluminum, non-magnetic stainless steel, plastics, or the like, is fastened to the annular rim of member 5 by means of screws 15 as shown in FIGURE 2. Bearing sleeve 16 is integral with disc 14 and supports shaft 13 for rotation about the axis of member 5. This shaft is limited in axial movement to the right by means of shoulder 17 and is limited in leftward displacement by means of attached collar 18 striking the end of sleeve 16. If a clutch of maximum responsiveness is desired, the member 14–16 can be eliminated and shaft 13 can be supported in a suitable bearing separate from the clutch. Shaft 2 or a connected shaft will of course be supported in a suitable bearing. Sleeve 16 may also be rotatably supported in a bearing.

Annular winding 19 surrounds driving member 12 and is situated between rings 6 and 7. Conductor 20 from one terminal of this winding passes through a radial bore in member 12 and then through axial bore 21 in this member. This conductor is then led up through a short radial bore in shaft 13 and is connected to brass or other slip ring 22 suitably mounted on a ring 23 of insulating plastic or other insulating material fastened around shaft 13. Conductor 20 is connected with slip ring 22. Conductor 24 leading from the other terminal of winding 19 is similarly connected to slip ring 25 mounted on insulating collar 26 which is attached to shaft 13.

Figure 3:
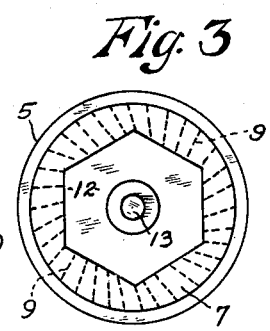
FIGURE 3 is an elevation of one face of a clutch similar to the clutch of FIGURE 1 but having modified construction.

The rings 6 and 7 may be attached to member 12 by pushing some of the pins or rods 8 or 9 down into holes in member 12 as indicated in FIGURE 2, or member 12 may be of hexagonal or other cross sectional shape as shown in FIGURE 3. If then the rings are molded around the hexagonal core there will be no slippage of band 7 on member 12. The pins 9, diagrammatically indicated, are shown as extending out flush with the outer surface of band 7. The radius of this band could be shortened however so that the pins woud extend beyond the surface of member 7 as shown in FIGURE 2. Rings 6 and 7 may be cemented to member 12 or they may be molded around recesses or lugs of this member to prevent slippage.

Suitable brushes 27 will be used in connection with slip rings 22 and 25 to conduct current to winding 19 when desired. In the event that alternating or rapidly fluctuating current is used it would be desirable to use laminated construction of the magnetic parts. It is not essential that wall 3 and member 5 be integral since the wall could be of non magnetic metal or other material and can be attached by screws or bolts. In assembling different materials it is preferable to use those having more or less compatible temperature coefficients of expansion.

In operation, driven shaft 2 is connected with a load of some kind and driving shaft 13 is connected with a source of power such as an engine, a motor, or a power shaft of any suitable kind. Brushes 27 are connected with a source of direct current through a switch not shown. When it is desired to transmit power from shaft 13 to shaft 2 the switch is closed so that direct current passes through winding 19. This produces a strong magnetic field circulating through members 12, 8, 5 and 9 so that the members or elements 8 and 9 will be strongly attracted to the inner surface 11 of cylindrical member 5. This results in a locking or semi-locking action between magnetic elements 8 and 9 and member 5 so that torque from shaft 13 and member 12 is transmitted to member 5 and shaft 2. This torque varies in proportion to the current.

The torque-current curve has the general shape of a magnetization curve, following almost a straight line for a portion of the curve and then tending to level out. In one relatively small clutch tested the torque was zero for zero magnetizing current and increased along a straight line up to a torque of 130 inch pounds at a magnetizing current of 0.3 ampere. Then the curve swung over at an average angle of about 45 degrees until it reached a torque of 260 inch pounds, at 1.0 ampere of magnetizing current; the winding potential being 30 volts in each case. This does not represent optimum operation but is illustrative of values involved.

If the magnetic elements 9 of FIGURES 2 and 3 are sloped as shown, the clutch will transfer more torque for rotation in counter clockwise direction for rotation in clockwise direction. The reason for this is that for rotation of member 12 in counter clockwise direction the elements 9, which are longer than the radial distance between members 12 and 5, tend to be pinched or locked between these members. Therefore high torque can be transmitted in that direction. For rotation in opposite direction the elements 9 tend to be pushed away from member 5 and therefore less torque will be transmitted. The angle or angles of inclination of elements 9 relative to inner surface 11 can be so chosen that the clutch will provide virtually a positive locking action or a lesser degree of engagement, as desired.

The elements 8 and 9 of rings 6 and 7 may be sloped in the same sense in order to provide maximum torque for one direction of rotation, or elements 8 and 9 may be sloped in opposite sense in order to provide substantially equal torque for both directions of rotation. In other words, all the elements 8 of ring 6 can be similarly sloped as described above to provide a pinching or locking action for one direction of rotation whereas each element would provide less pinching action for the opposite direction of rotation, for the same magnetizing current. It is clear that if all the elements 8 of ring 6 and all the elements 9 of ring 7 are similarly sloped relatively to member 12 then each element will produce more pinching or clutching torque for the direction of rotation which tends to cause the elements to be wedged between members 12 and 5, rather than for the opposite direction of rotation. If however, elements 8 are sloped to provide maximum pinching action for one direction of rotation and elements 9 are sloped to provide maximum pinching or wedging action for the opposite direction of rotation, a proper choice of components, slope, and similar factors can provide equal wedging action, or driving torque for either direction of rotation. Likewise, half of the elements 8 may be sloped in one sense and the other half of these elements may be sloped in opposite sense so that band 6 will transmit equal torques for either direction of rotation, assuming the same magnetizing current in each case. Band or ring 7 may be similarly constructed. It is preferable for the inner ends of elements 8 and 9 to remain in contact with member 12 and this member may be provided with depressions or recesses to prevent slippage of these elements. The outer ends of elements 8 and 9 may normally be lightly in contact with surface 11 or slightly separated therefrom. When the unit is magnetized the elements will be magnetically pulled into contact with the inner surface 11 of member 5, thereby stressing resilient or pliable material 10 which, preferably, should have enough resiliency quickly to move elements 8 and 9 out of driving engagement with surface 11 when winding 19 is de-energized. The inner ends of elements 8 and 9 may project slightly beyond the surface of the plastic or rubber rings holding them, in order to make contact with the metal of member 12.

Since the outer ends of elements 8 and 9 are in such close proximity to surface 11, the clutch will provide driving action very rapidly after establishing current in winding 19. Any delay will be due mostly to the reactance of the winding and associated means. In any event the action will be quite rapid and the components can be designed so that the clutch action will be extremely fast as compared to various other magnetic clutches. De-clutching will also be fast and this can be accelerated by a reversal of direction of current through winding 19, momentarily.

The material 10 holding the magnetizable elements 8 and 9 may be rubber, silicone rubber, resilient plastics such as vinyls or polyvinyls, foam rubber, leather, fabrics or rubber impregnated fabrics, or any suitable plastic or other material providing the desired resiliency or pliability and wearing qualities. If the magnetic elements extend beyond the outer surfaces of the rings there will be little wear of the binding or holding material. If the magnetic elements 8 and 9 are flush with the working surface of the binder, or slightly below this surface, the binding pliant material will be twisted to expand against surface 11 when the clutch is energized. This will provide a driving torque.

Figure 4:
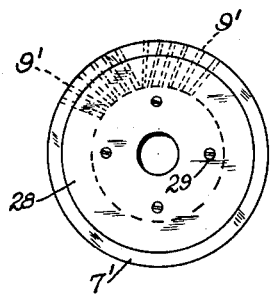
FIGURE 4 is a face view of a clutch ring assembly having a non-magnetic retaining disc.

As shown in FIGURE 4, some of the elements 9' may be sloped in one sense and other elements 9' may be sloped in opposite sense. These may be divided half with one slope of one sense and half with slope of opposite sense, or in any desired proportion to provide a predetermined driving action in one direction as compared to the driving torque in opposite direction. Brass, aluminum, or other non-magnetic annular disc 28, of slightly smaller diameter than the diameter of ring 7', may be attached to a face of driving member 12' by means of screws 29. A similar annular disc may be fastened to the opposite face of member 12' which is similar to driving member 12. These discs will prevent the rings 6' and 7' from slipping off the driving element 12'.

Figure 5:
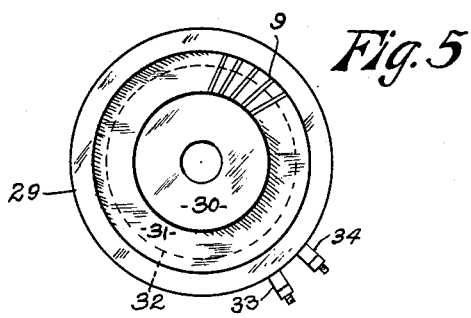
FIGURE 5 is a plan view of a magnetizing device for making clutch rings or bands.

FIGURE 5 shows a plan view of a magnetizing device for making the bands or rings 6 and 7. The annular rim 29 and centrally located cylinder 30 may be integral with the connecting base, or cylinder 30 may be removable, in which case it can be set in a locating depression in the base, or a central dowel may be used.

These members are made of silicon steel, ingot iron, or the equivalent. Brass or other non-magnetic annular plate 31 is placed around cylinder 30 which has a shoulder supporting plate 31. The cylinder 30 rises from the base beneath annular plate 31 and magnetizing winding 32 surrounds cylinder 30. Terminals of this winding are connected to respective binding posts 33 and 34. The brass annulus 31 is placed at a level below the top edge of member 29, corresponding to the desired axial thickness of the clutch rings to be made.

In operation, the steel wires or pins 9 are placed between members 29 and 31 and then a direct current is supplied to binding posts 33 and 34 to energize winding 32. When this happens the magnetic elements 9 are pulled into contact with magnetized members 29 and 30 as indicated. The winding is then de-energized and more elements 9 are placed in the annular recess and are magnetized to bring them into contact with members 29 and 30. These steps are repeated until elements 9 are built up to the desired aggregate thickness. Liquid rubber, synthetic rubber, plastic, or other desired resilient or flexible binder material can then be poured into the mold and penetrates the spaces between elements 9. This binder can then be cured by heat, chemical treatment, or exposure to air, depending upon the particular material used. The liquid binder may be added periodically as the thickness of the aligned elements 9 is increased. The binder can be melted in some cases or dissolved in case other types of materials are used. "Neoprene," "Elastoplastic," or "Lasting" are trade names of resilient materials which can be used. The elements 9 may be coated with rubber, or the like to provide spacing between the elements.

Figure 6:
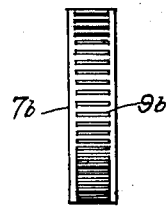
FIGURE 6 is an edge view of a clutch ring comprising resilient or flexible material containing a plurality of generally radial, relatively wide magnetizable elements.

FIGURE 6 shows a clutch ring 7b in which the magnetizable elements 9b are thin flexible strips almost as wide as the ring which otherwise is constructed generally as described. The wider strips makes easier assembly of the rings possible. A modification of elements 9b is shown in FIGURE 7 in which the elements 9c have a plurality of tines 35. The elements are then held in a suitable binder which may extend for the full length of the tines or the ends of the tines may project beyond the binder to provide greater flexibility. The elements 9c are arranged radially as indicated by elements 9 of FIGURE 4 or FIGURE 5. The elements are somewhat longer than the radial distance between the outer surface of the member 12 and the inner surface 11 of member 5. Suitable wires or binding cords may be passed through holes or slots in elements 9b or 9c in order to help hold them in position.

Figure 7A:
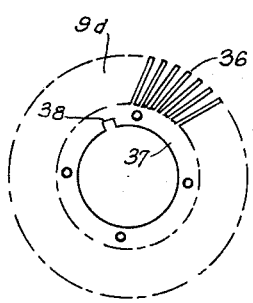
FIGURE 7a is a fragmentary face view of a stamped clutch gripping element.
Figure 7:
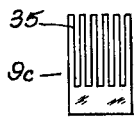
FIGURE 7 is an elevation of a modified magnetizable element for use in a clutch band or ring similar to that shown in FIGURE 6.

FIGURE 7a shows still another modification of the clutching elements. The magnetizable elements 9d are stamped or otherwise made from relatively thin sheets of silicon steel or the equivalent. The radial fingers or tines 46 are integral with annular supporting ring 37 which has keyway 38. These stampings may be of any desired thickness but, generally, a thickness of 0.02 to 0.06 inch is suitable. The punched laminations are preferably annealed and may be riveted together to make a stack of the desired axial thickness. Then the stacks or units can be slipped over driving member 12 of FIGURE 1 and may be locked in place by a key pushed into slot 38 and a cooperating slot in member 12. The member 12 may have two circumferential rings or shoulders situated between winding 19 and units 6 and 7, in order to protect the winding and to limit movement axial displacement of these units.

The space between tines 36 may be filled with rubber or other resilient or flexible material or the tine ends may project beyond the filler material. The tines in any stack may be aligned, looking along the axis, or they may be in haphazard arrangement. Another arrangement is to have the tines of any lamination covering the space between tines of adjacent laminations. This would allow more freedom of movement of the tines. In order to provide flexibility of the tines, the laminations may be made thicker, at rings 37 or the laminations may be spaced by suitable thin washers or separators.

Another modification would be to have tines 36 milled out of a disc which is of the desired thickness, the spaces being filled or partially filled with rubber or the like. This will provide a clutch ring of the general type indicated in FIGURE 6. It is desirable to have many metallic contacts between the driving and driven members and the driving members can be wire brushes having steel wire for magnetization. If desired, the wearing surfaces can be case hardened but silicon steel having from 3 to 5% silicon is fairly hard. Nickel steels can be used likewise. In any ring or disc, part of the wires may be sloped in one direction and part in another direction, relatively, in order to provide equal driving torque in both directions of rotation of the clutch.

Figure 8:
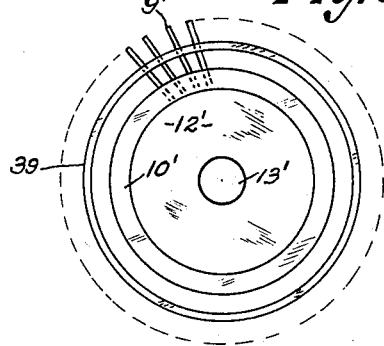
FIGURE 8 is a face view of a clutch band or ring assembly in which the magnetizable elements are held by a plurality of resilient or flexible bands.

As shown in FIGURE 8, a somewhat thinner rubber or other flexible band 10' may be placed around driving member 12' and the foot portions of elements 9' are imbedded in band 10'. The elements 9' pass through flexible band 39, which construction allows considerable freedom of movement of the clutch elements 9'.

Figure 9:
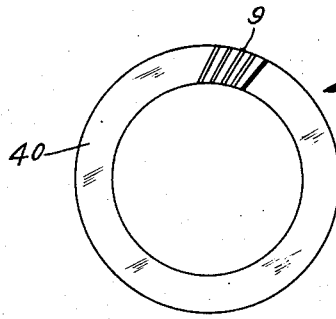
FIGURE 9 shows a plan view of a thin elastic or flexible ring having magnetizable elements attached thereto.

FIGURE 9 illustrates a method of building up the clutch rings 6 and 7. Rubber or other elastic or flexible band 40 is coated with adhesive and elements 9 are laid around the band separated by the desired spacing. These elements may be coated with rubber which will provide the correct spacing when the coatings are in contact. The elements 9 of FIGURE 5 or in other modifications may also be coated with rubber to provide ease of assembly and adequate spacing. The band 40 may be rotated and elements 9 may be automatically dropped upon the adhesive-coated band, at the desired angle. Then a plurality of these composite bands may be flexibly cemented together to make a band of the desired axial thickness. This assembled band can then be used as members 6 and 7 of FIGURE 1.

Figure 10:
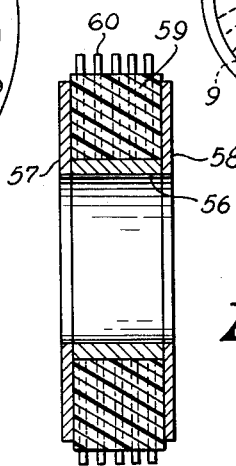
FIGURE 10 is a sectional edge view of an annular type clutch unit having plastic or other flexible material held in a frame.

In FIGURE 10, steel or other magnetizable collar 56 is attached concentrically to annular rings 57 and 58 of plastic, brass, or other non-magnetic material. Resilient plastic or other material 59 is an annulus surrounding ring 56 and carrying imbedded magnetizable steel or other pins 60 the long axes of which preferably do not pass through the axis of ring or collar 56. The outer ends of pins 60 are substantially the same radial distance from the axis of collar 56. This unit may be used in place of units 6 and 7 of FIGURE 1 and has the advantage that it is supported to provide a stronger construction. The outer surface of collar 56 may have projecting pins or teeth to engage material 59 to prevent slippage. The collar 56 may be attached to member 12 or to a shaft by means of a key or otherwise.

The principles described in connection with this magnetic clutch can, of course, be applied to make a magnetic brake. As a matter of fact, if one shaft of any of the clutches described is fixed, then the other shaft will be braked in proportion to the magnitude of current in the magnetizing winding.

What I claim is:

1. In a power transmission device, a rotatable magnetizable member, a pair of spaced flexible elements carried by said member, said flexible elements having elongated magnetizable elements supported therein and angularly aligned relative to radial directions of said flexible elements, winding means surrounding said member between said spaced flexible elements, and a rotatable magnetizable member surrounding said flexible elements and adjacent to the outer ends of said elongated magnetizable elements.

2. In a power transmission device, a rotatable magnetizable member, a pair of spaced flexible elements carried by said member and containing magnetizable elements therein, winding means surrounding said member and situated between said flexible elements, and a rotatable magnetizable member surrounding said flexible elements and adjacent said magnetizable elements.

3. The power transmission device as described in claim 2, the inner surface of the second named rotatable magnetizable member having at least a portion thereof of circular curvature.

4. In a power transmission device, a first rotatable magnetizable member, a pair of spaced flexible elements carried by said member and supporting elongated magnetizable elements the outer ends of which are substantially at the same radial distance from the axis of said first magnetizable member, a second rotatable magnetizable member surrounding said flexible elements and having an inner circular surface adjacent ends of at least a plurality of said magnetizable elements which are longer than the radial distance between said first magnetizable member and said inner circular surface of said second magnetizable member, and magnetizing winding means placed between said flexible elements and surrounding said first magnetizable member.

5. The device as described in claim 4, some of said elongated magnetizable elements being sloped to provide maximum driving torque between said surrounding member and said first magnetizable member for one direction of rotation thereof, and other of said elongated magnetizable elements being sloped to provide maximum driving torque in opposite direction.

6. The device as described in claim 4, said first rotatable magnetizable member being of polygonal cross sectional shape.

7. The device as described in claim 4, at least one of said flexible elements having a periphery of less radial distance from the axis of said magnetizable member than the radial distances of the outer ends of said magnetizable elements supported by said flexible element.

8. In a power transmission device, magnetizable driving means, magnetizable driven means, a flexible ring-like member surrounding one of said means between said driving and driven means one of which means surrounds the other said means and is radially spaced therefrom, a plurality of elongated magnetizable elements carried by said flexible member, said elements stressing said flexible member and being in contact with both said driving and driven means when adequately magnetized; and means for magnetizing said driving and driven means and said elongated elements.

9. In a power transmission device, magnetizable driving means, magnetizable driven means, one of said means surrounding the other said means and radially spaced therefrom, a pair of axially spaced flexible ring-like members rotated by one of said means and situated between said means, a plurality of elongated magnetizable elements carried by said flexible members and being sufficiently long to touch both said magnetizable driving and driven means when magnetized, and winding means for magnetizing said driving and driven means and said elements.

10. In a power transmission device, magnetizable driving means, magnetizable driven means, one of said means surrounding the other said means and radially spaced therefrom, a flexible member situated between said means, a plurality of magnetizable strips carried by said flexible member and sufficiently long to touch both said driving and driven means, and means for magnetizing said strips and said magnetizable means.

11. In a power transmission device, magnetizable driving means, magnetizable driven means, one of said means at least partially surrounding the other said means and radially spaced therefrom, flexible material situated in the space between said means and carried by one of said means, a plurality of elongated magnetizable elements supported by said material and substantially bridging space between said driving and driven means when sufficiently magnetized, and means for magnetizing said driving and driven means and said elements.

12. In a power transmission device, rotatable magnetizable driving means, coaxial rotatable magnetizable driven means, one of said means at least partially surrounding the other said means and being radially spaced therefrom, a pair of axially spaced flexible ring-like members rotated by one of said means and situated between said means, a plurality of elongated magnetizable elements carried by said flexible members and aligned to provide driving torque between said means when sufficiently magnetized, and an electrical winding surrounding the inner of said means and situated between said members.

13. The device as described in claim 12, and including slip rings rotated by the inner of said means and connected with said winding.

14. In a power transmission device, a magnetizable cylinder, a shaft extending therefrom coaxially therewith, a magnetizable member coaxial with said cylinder and radially spaced therefrom and surrounded thereby, a pair of axially spaced rings of resilient material surrounding said member and situated between said member and said cylinder, a plurality of elongated magnetizable elements carried by said material and engaging said member and cylinder to provide transmission of power therebetween when sufficiently magnetized, and an electrical winding surrounding said member and placed between said rings.

15. The device as described in claim 14, and a shaft extending from said magnetizable member coaxially therewith.

16. The device as described in claim 14, and including another shaft extending from said magnetizable member coaxially therewith, bearing means surrounding said other shaft and attached to said cylinder.

17. A composite member for a power transmission device, said member comprising a ring-like element of flexible material holding a plurality of magnetizable strips of greater width than thickness, the mid planes of said strips being substantially parallel with the axis of said member and displaced therefrom, said strips comprising a plurality of tines joined at ends thereof.

References Cited in the file of this patent

UNITED STATES PATENTS

| 2,300,223 | Hottenroth | Oct. 27, 1942 |
|---|---|---|
| 2,568,824 | Rahbek | Sept. 25, 1951 |
| 2,614,670 | Heintz | Oct. 21, 1952 |
| 2,624,435 | Stephenson | Jan. 6, 1953 |
| 2,624,436 | Gamble | Jan. 6, 1953 |
| 2,689,633 | Turner | Sept. 21, 1954 |
| 2,771,171 | Schultz | Nov. 20, 1956 |
| 2,848,748 | Crump | Aug. 26, 1958 |
| 2,902,721 | Heuer | Sept. 8, 1959 |
| 2,919,000 | Claytor | Dec. 29, 1959 |
| 2,955,692 | Thomas | Oct. 11, 1960 |
| 2,998,874 | MacNeill | Sept. 5, 1961 |